(12) United States Patent
Winney

(10) Patent No.: US 6,782,844 B2
(45) Date of Patent: Aug. 31, 2004

(54) AUTOMATIC WATER SUPPLY DEVICE

(76) Inventor: Mark V. Winney, 6125 Blossom Knoll Ave., Las Vegas, NV (US) 89108

( * ) Notice: Subject to any disclaimer, the term of this patent is extended or adjusted under 35 U.S.C. 154(b) by 103 days.

(21) Appl. No.: 09/848,656

(22) Filed: May 4, 2001

(65) Prior Publication Data

US 2002/0162513 A1 Nov. 7, 2002

(51) Int. Cl.$^7$ .................................................. A01K 7/04
(52) U.S. Cl. .......................................... 119/78; 119/74
(58) Field of Search .............................. 119/78, 61, 72, 119/74, 61.5, 61.51, 6.52, 61.53, 61.54; 137/414

(56) References Cited

U.S. PATENT DOCUMENTS

| | | | | |
|---|---|---|---|---|
| 3,138,140 A | * | 6/1964 | Byrd ........................... | 119/80 |
| 4,274,365 A | * | 6/1981 | Peters .......................... | 119/78 |
| 4,394,847 A | * | 7/1983 | Langenegger et al. ........ | 119/75 |
| 4,470,371 A | * | 9/1984 | Strickland .................... | 119/78 |
| 5,582,132 A | * | 12/1996 | Morton ........................ | 119/80 |
| 5,782,035 A | * | 7/1998 | Locke et al. ................... | 47/79 |
| 5,782,202 A | * | 7/1998 | Strickland .................... | 119/78 |

* cited by examiner

*Primary Examiner*—Yvonne Abbott
(74) *Attorney, Agent, or Firm*—Jeffrey Weiss; Jeffrey D. Moy; Weiss, Moy & Harris, P.C.

(57) ABSTRACT

An automatic water supply device and method therefore, comprising a water container, a pressure sensitive diaphragm refill valve, and a garden hose adapter. In a preferred embodiment, a pet is supplied automatically with fresh drinking water as needed. In another preferred embodiment, a tile saw cooling system is supplied with a constant flow of clean water.

18 Claims, 2 Drawing Sheets

AUTOMATIC WATER SUPPLY DEVICE

BACKGROUND OF THE INVENTION

1. Field of the Invention

This invention relates generally to automatic water supply devices and, more specifically, to a pet watering device and the method for supplying a pet automatically with fresh drinking water as needed as well as a water recovery device for a tile saw and the method for supplying a constant flow of clean water to a tile saw cooling system.

2. Description of the Prior Art

The prior art illustrates, various automatic water supply devices for different applications.

One application comprises an automatic watering device to keep domestic pets and livestock replenished with water for an extended period of time, without involvement by an owner or a caretaker. For example, U.S. Pat. No. 5,582,132 issued to Morton, U.S. Pat. No. 5,782,202 issued to Strickland, U.S. Pat. No. 4,470,371 issued to Strickland, U.S. Pat. No. 4,274,365 issued to Peters, U.S. Pat. No. 4,138,967 issued to Tamborrino, U.S. Pat. No. 3,138,140 issued to Byrd, and U.S. Pat. No. 649,436 issued to Cooper, all utilize a system with a standard ball cock float system with different designs or a similar float system, which is incorporated into the shape of the water dish itself.

In general, prior art float valve assemblies consist of a movable float that is horizontally positioned within the reservoir and is mechanically linked to the valve through a float arm or lever. The float-activated valve automatically replenishes the water supply in the drinking reservoir as that supply is depleted. However, these devices are relatively complicated in their design, space consuming, and expensive. Because they do consist of many parts that are mechanically connected, they are unreliable, become easily inoperable, can be accidentally upset by the animal, and require a high amount of maintenance. To prevent injury to the animal and to keep the valve functioning, the bulky float valve assembly often needs to be separated from the animal's drinking reservoir.

A different application where a constant supply of clean water is needed is the cooling system of a tile saw. A tile saw relies on water being distributed through orifices directed toward a diamond impregnated blade to keep the blade at a low operating temperature.

In general, the prior art consists of a small water pump that is placed in a self-contained tray. After cutting several pieces of tile, the water in the tray becomes contaminated. The water pump continues to circulate the contaminated water until eventually the water circuits become obstructed along with the water pump itself and the cooling system fails.

Therefore a need existed to provide a device that provides an uninterrupted automatic supply of fresh water that is practical, low maintenance, jam resistant, portable, easily secured, self cleaning and inexpensive. A further need existed to provide an automatic water supply device that uses a compact, jam resistant, reliable, and easily adjustable valve. A still further need existed to provide an improved, practical, and inexpensive automatic pet watering device that provides an uninterrupted supply of fresh drinking water as needed. A still further need existed to provide a practical and inexpensive water recovery device that provides the cooling system of a tile saw with a constant flow of fresh water.

SUMMARY OF THE INVENTION

An object of the present invention is to provide a practical, inexpensive, and reliable automatic water supply device.

It is a further object of the present invention to provide an improved, practical, inexpensive, and reliable automatic pet watering device.

It is a still further object of the present invention to provide a practical, inexpensive, and reliable water recovery device for a tile saw.

BRIEF DESCRIPTION OF THE PREFERRED EMBODIMENTS

In accordance with one embodiment of the present invention, an automatic water supply device is disclosed which comprises, in combination, a water container; a pressure sensitive diaphragm refill valve comprising a rubber diaphragm, an adjustable screw, and an outlet; means for extending the adjustable screw; and a water inlet.

In accordance with another embodiment of the present invention, a method for supplying a pet automatically with fresh drinking water as needed is disclosed, comprising, in combination, the steps of providing a water container; providing a pressure sensitive diaphragm refill valve comprising a rubber diaphragm, an adjustable screw, and an outlet; providing means for extending the adjustable screw; providing a water inlet; filling the water container with water; adjusting water level using the adjustable screw; lowering the water level of the water container by animal; activating the pressure sensitive diaphragm refill valve; and refilling the water container to the adjusted level.

In accordance with another embodiment of the present invention, a method for supplying a constant flow of clean water to a tile saw cooling system is disclosed, comprising, in combination, the steps of providing a water container; providing a pressure sensitive diaphragm refill valve comprising a rubber diaphragm, an adjustable screw, and an outlet; providing means for extending the adjustable screw; providing a water inlet; filling the water container with water; adjusting water level using the adjustable screw; lowering the water level of the water container by a pump of the tile saw cooling system; activating the pressure sensitive diaphragm refill valve; and refilling the water container to the adjusted level.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
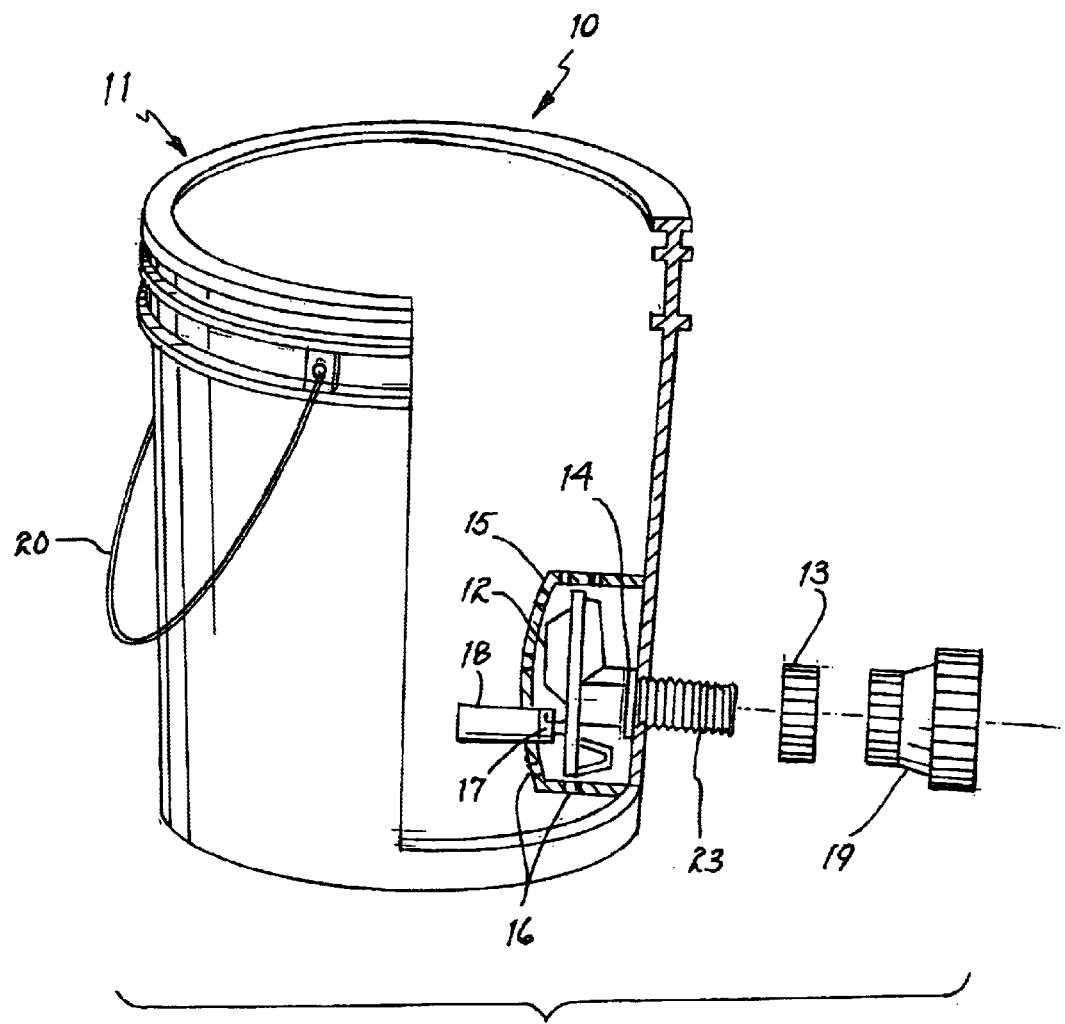
FIG. 1 is a cross-sectional view of the automatic water supply device, wherein the refill valve is installed within the water container.
Figure 2:
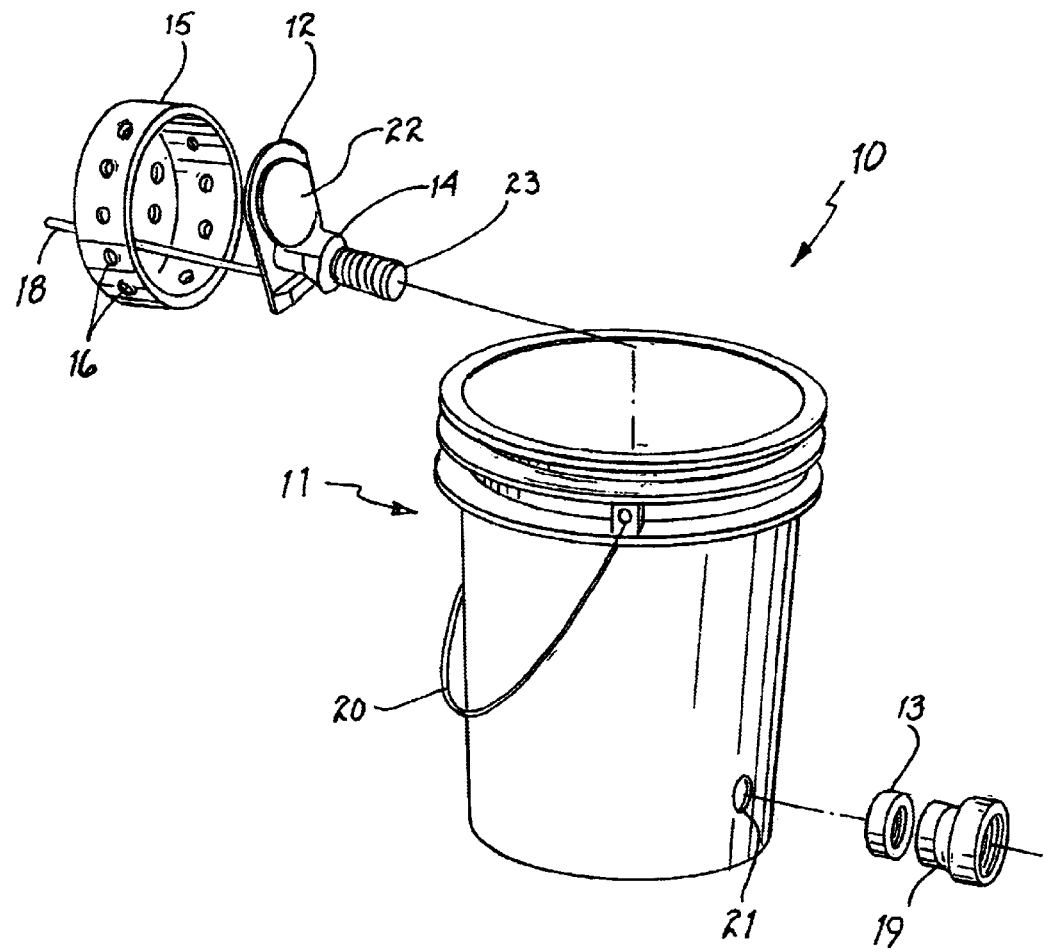
FIG. 2 is a perspective view of the parts of the automatic water supply device.

Referring to FIGS. 1–2, a cross-sectional view of an automatic water supply device 10 according to the present invention is shown. The automatic water supply device 10 generally comprises a water container 11, a pressure sensitive diaphragm refill valve 12, and a garden hose adapter 13.

Still referring to FIGS. 1–2 the water container 11, having an inside, an outside, a bottom and an open top, preferably includes a built in handle 20. The handle 20 can be used to secure the water container 12 to any wall or fence using a half-inch conduit strap, and can be used to transport the automatic water supply device 10 easily. The water container 11 is preferably a plastic utility bucket having a volume of 3½ gallons or 5 gallons.

Still referring to FIGS. 1–2, the pressure sensitive diaphragm refill valve 12 is installed at the inside of the water container 11 by inserting it through an aperture 21 (shown in FIG. 2 only) and securing it using a rubber washer 14 on the inside of the water container 11 and a retaining nut 13 on the outside of the water container 11. The pressure sensitive diaphragm refill valve 12 is covered by a protective cap 15, preferably a four inch PVC pipe cap, and has water access holes 16 drilled there through. The protective cap 15 is mounted to the inside of the water container 11 and fits over the refill valve 12. The pressure sensitive diaphragm refill valve 12 comprises generally a pressure sensitive rubber diaphragm 22 (shown in FIG. 2 only), an adjustable screw 17 (shown in FIG. 1 only) that is used to regulate the water level in the water container 11, and an outlet 23. Low water pressure on the inside of the water container 11 starts the flow of fresh water through the outlet 23 from the outside. High water pressure on the inside of the water container 11 stops the flow of water. The adjustable screw 17 (shown in FIG. 1 only) can be extended through the protective cap 15 by tube 18, preferably a ⅜-inch vinyl tube, for easy access.

Still referring to FIGS. 1–2, a garden hose adapter 19 is mounted on the outside of the water container 11 at the refill valve outlet 23 next to the retaining nut 13. Using a common garden hose, fresh water can be delivered to the water container 11 from any faucet. It should be understand that the garden hose adapter 19 can be replaced with an inlet for a water supply coming from a source other than a garden hose.

The automatic water supply device 10 can be used as an automatic pet watering device. The animal can drink the water from the water container 11 through the open top. The consumed water will be automatically refilled since a lower water level in the water container 11 results in a lower water pressure, activating the diaphragm refill valve 12. Fresh water will flow in until the water pressure on the outside and inside of diaphragm 22 (shown in FIG. 2 only) is the same.

The automatic water supply device 10 can further be used as a water recovery device for a tile saw. A pump from a tile saw cooling system can be submerged into the water container 11, preferably a 5 gallon plastic utility bucket, through the open top. As the pump uses a certain amount of water, the diaphragm refill valve 12 is activated and the water container 11 refills automatically. The automatic water supply device 10 provides not only clean water for the pump, but by supplying a constant flow of clean water to a tile saw cooling system it also eliminates the need to stop working and refill the bucket with water frequently.

The automatic water supply device 10 is relatively maintenance free and virtually self-cleaning. The water container 11 only needs to be turned sideways to empty. This causes the refill valve 12 to open, and the inflowing water rinses the water container 11. Turning the water container 11 upright again ends the cleaning process and starts filling the water container 11 with fresh water again. The automatic water supply device 10 is jam resistant, even if the water container 11 has overturned, the refill valve 12 will not become inoperable.

By introducing a diaphragm activated fill valve 12 inside a water container 11 instead of a prior art float valve mechanism, problems associated with the prior art watering devices are solved. The diaphragm activated fill valve 12 has a very compact design and can be easily adjusted to every desired water level.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An automatic water supply device comprising, in combination:
    a water container having an inside, an outside, a bottom, and an open top;
    an aperture proximate said bottom of said water container;
    a pressure sensitive diaphragm refill valve comprising a rubber diaphragm, an adjustable screw, and an outlet disposed through said aperture;
    means for extending said adjustable screw;
    a water inlet mounted on said outside of said water container at said outlet of said pressure sensitive diaphragm refill valve;
    a rubber washer located on said inside of said water container disposed over said pressure sensitive diaphragm refill valve; and
    a retaining nut located on said outside of said water container disposed over said outlet.

2. The device of claim 1, wherein said water container is a plastic utility bucket having a volume of approximately three and one half gallons.

3. The device of claim 1, wherein said water container is a plastic utility bucket having a volume of approximately five gallons.

4. The device of claim 1, further comprising means for securing and transporting said water container.

5. The device of claim 1, further comprising a protective cap covering said pressure sensitive diaphragm refill valve.

6. The device of claim 5, wherein said protective cap is a four inch PVC pipe cap having water access holes.

7. The device of claim 1, wherein said means for extending said adjustable screw is a ⅜ inch vinyl tube.

8. The device of claim 1, wherein said water inlet is a garden hose.

9. The device of claim 1, wherein said automatic water supply device is a pet watering device.

10. The device of claim 1, wherein said automatic water supply device is a water recovery device for a tile saw cooling system.

11. A method for supplying a pet automatically with fresh drinking water as needed, comprising, in combination, the steps of:
    providing a water container having an inside, an outside, a bottom, and an open top;
    providing an aperture proximate said bottom of said water container;
    providing a pressure sensitive diaphragm refill valve comprising a rubber diaphragm, an adjustable screw, and an outlet disposed through said aperture;
    providing means for extending said adjustable screw;
    providing a water inlet mounted on said outside of said water container at said outlet of said pressure sensitive diaphragm refill valve;
    providing a rubber washer located on said inside of said water container disposed over said pressure sensitive diaphragm refill valve;

providing a retaining nut located on said outside of said water container disposed over said outlet;

filling said water container with water;

adjusting water level using said adjustable screw;

lowering water level of said water container by animal;

activating said pressure sensitive diaphragm refill valve; and refilling said water container to adjust level.

12. The method of claim 11, wherein said water container is a plastic utility bucket having a volume of approximately three and one half gallons.

13. The method of claim 11, wherein said water container is a plastic utility bucket having a volume of approximately five gallons.

14. The method of claim 11, further comprising means for securing and transporting said water container.

15. The method of claim 11, further comprising a protective cap covering said pressure sensitive diaphragm refill valve.

16. The method of claim 15, wherein said protective cap is a four inch PVC pipe cap having water access holes.

17. The method of claim 11, wherein said means for extending said adjustable screw is a ⅜ inch vinyl tube.

18. The method of claim 11, wherein said water inlet is a garden hose.

* * * * *